United States Patent
Steele et al.

(10) Patent No.: US 6,843,143 B2
(45) Date of Patent: Jan. 18, 2005

(54) SEAT BELT TENSION SENSOR

(75) Inventors: Ryan N. Steele, Dearborn, MI (US); James G. Stanley, Novi, MI (US); Kurt L. VanVoorhies, Detour Village, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 10/250,161

(22) Filed: Jun. 9, 2003

(65) Prior Publication Data

US 2003/0226409 A1 Dec. 11, 2003

Related U.S. Application Data (60) Provisional application No. 60/387,136, filed on Jun. 7, 2002.

(51) Int. Cl.[7] ............................... G01L 1/26
(52) U.S. Cl. ............................... 73/862.393
(58) Field of Search .................. 73/160, 862.391, 73/862.393, 826, 158, 159, 828

(56) References Cited

U.S. PATENT DOCUMENTS

| | | | |
|---|---|---|---|
| 1,650,603 A | 11/1927 | Burton | 73/862.454 |
| 2,343,229 A | 2/1944 | Stone et al. | 265/1.6 |
| 2,434,138 A | 1/1948 | Adams | 177/48 |
| 2,452,302 A | 10/1948 | Hitchen | 73/862.471 |
| 2,604,782 A | 7/1952 | Rissler et al. | 73/143 |
| 2,659,574 A | 11/1953 | Crookston | 254/173 |
| 2,752,558 A | 6/1956 | Kane | 323/64 |
| 2,925,731 A | 2/1960 | Cammack | 73/144 |
| 3,149,488 A | 9/1964 | Castro | 73/141 |
| 3,203,672 A | 8/1965 | Santos | 254/173 |
| 3,260,106 A | 7/1966 | Hull et al. | 73/862.474 |
| 3,362,585 A | 1/1968 | Nessim et al. | 222/55 |
| 3,366,298 A | 1/1968 | Bahrani | 226/1 |
| 3,376,740 A | 4/1968 | Harvey | 73/144 |
| 3,426,589 A | 2/1969 | Brendel | 73/862.471 |
| 3,433,064 A | 3/1969 | Jacobson | 73/862.382 |
| 3,444,731 A | 5/1969 | Nieuweboer | 73/144 |
| 3,462,731 A | 8/1969 | Gray | 340/457.1 |
| 3,602,866 A | 8/1971 | Saxl | 338/5 |
| 3,610,342 A | 10/1971 | Stainken | 177/147 |
| 3,618,378 A | 11/1971 | Shull et al. | 73/144 |
| 3,675,482 A | 7/1972 | Hewitt | 73/144 |
| 3,720,100 A | 3/1973 | Grunbaum | 73/144 |
| 3,817,093 A | 6/1974 | Williams | 73/144 |
| 3,834,225 A | 9/1974 | Burchett | 73/144 |
| 3,943,761 A | 3/1976 | Shoberg et al. | 73/144 |
| 4,130,014 A | 12/1978 | Eddens | 73/144 |
| 4,141,245 A | 2/1979 | Brandstetter | 73/144 |
| 4,198,011 A * | 4/1980 | Kamijo et al. | 242/385.3 |
| 4,222,551 A | 9/1980 | Simon | 177/132 |

(List continued on next page.)

FOREIGN PATENT DOCUMENTS

| | | | |
|---|---|---|---|
| DE | 4039121 A1 | 6/1991 | B65H/63/04 |

*Primary Examiner*—Max Noori
(74) *Attorney, Agent, or Firm*—Dinnin & Dunn, P.C.

(57) ABSTRACT

A lever is adapted to rotate about a first pivot at a first location responsive to a tension load from a webbing applied to an attachment pivoted or arcuately slotted about a second location. Tension load is reacted by a spring against a reaction element, and is sensed by either a displacement sensor or a force sensor. The sensed load range can be limited by a stop that engages the lever. The anchor bolt can be utilized as a stop in cooperation with a slot in the lever, wherein the lever is adapted to rotate about a stud depending from the reaction element. A tang portion of the lever engages a slot of a slide, and the displacement of the slide caused by a rotation of the tang reacted by springs at the ends of the slide is measured by a magnetic field sensor on the reaction element in cooperation with a pair of magnets on the slide.

41 Claims, 8 Drawing Sheets

U.S. PATENT DOCUMENTS

| | | | | |
|---|---|---|---|---|
| 4,326,424 A | | 4/1982 | Koenig | 73/862.48 |
| 4,437,352 A | | 3/1984 | Deborde et al. | 73/862.47 |
| 4,530,245 A | | 7/1985 | Jacobson | 73/768 |
| 4,587,855 A | | 5/1986 | Yamada et al. | 73/862.48 |
| 4,597,297 A | | 7/1986 | Smith | 73/862.48 |
| 4,677,861 A | | 7/1987 | Bartholomew | 73/862.54 |
| 4,721,269 A | | 1/1988 | Gulette et al. | 242/385.2 |
| 4,759,226 A | | 7/1988 | Leurer | 73/862.48 |
| 4,805,467 A | | 2/1989 | Bartholomew | 73/862.54 |
| 4,846,000 A | | 7/1989 | Steinseifer | 73/862.47 |
| 4,949,931 A | * | 8/1990 | Fujiwara et al. | 248/429 |
| 4,979,400 A | | 12/1990 | Bartholomew | 73/862.54 |
| 5,019,017 A | | 5/1991 | Monch | 474/102 |
| 5,054,815 A | * | 10/1991 | Gavagan | 280/808 |
| 5,129,485 A | | 7/1992 | Hoch | 187/20 |
| 5,149,922 A | | 9/1992 | Kondou | 187/131 |
| 5,157,966 A | | 10/1992 | Lugosi et al. | 73/118.1 |
| 5,181,739 A | | 1/1993 | Bauer et al. | 280/807 |
| 5,287,756 A | | 2/1994 | Tassic | 73/862.391 |
| 5,289,987 A | * | 3/1994 | Collins et al. | 242/385.3 |
| 5,313,345 A | | 5/1994 | Schandl et al. | 360/74.1 |
| 5,329,822 A | | 7/1994 | Hartel et al. | 73/862.61 |
| 5,332,262 A | | 7/1994 | Chou | 280/806 |
| 5,365,797 A | | 11/1994 | McCrory, III | 73/862.44 |
| 5,511,820 A | | 4/1996 | Hatfield | 280/733 |
| 5,522,619 A | | 6/1996 | Collins | 280/806 |
| 5,591,944 A | | 1/1997 | Meyer | 177/229 |
| 5,615,917 A | | 4/1997 | Bauer | 280/805 |
| 5,629,487 A | | 5/1997 | Mucke et al. | 73/818 |
| 5,650,704 A | | 7/1997 | Pratt et al. | 318/623 |
| 5,714,693 A | | 2/1998 | Sturm | 73/862.454 |
| 5,718,451 A | | 2/1998 | White | 280/735 |
| 5,905,210 A | | 5/1999 | O'Boyle et al. | 73/862.331 |
| 5,959,220 A | | 9/1999 | Jun | 73/862.391 |
| 5,960,523 A | | 10/1999 | Husby et al. | 24/633 |
| 5,965,827 A | | 10/1999 | Stanley et al. | 73/862.391 |
| 5,996,421 A | | 12/1999 | Husby | 73/862.451 |
| 6,026,694 A | | 2/2000 | Gray | 73/862.68 |
| 6,081,759 A | | 6/2000 | Husby et al. | 701/45 |
| 6,122,978 A | | 9/2000 | Callendrier | 73/862.474 |
| 6,151,540 A | | 11/2000 | Anishetty | 701/45 |
| 6,205,868 B1 | | 3/2001 | Miller | 73/862.391 |
| 6,209,915 B1 | | 4/2001 | Blakesley | 280/801.1 |
| 6,230,088 B1 | | 5/2001 | Husby | 701/45 |
| 6,259,042 B1 | | 7/2001 | David | 177/136 |
| 6,260,879 B1 | | 7/2001 | Stanley | 280/735 |
| 6,264,236 B1 | | 7/2001 | Aoki | 280/735 |
| 6,301,977 B1 | | 10/2001 | Stojanovski | 73/862.393 |
| 6,311,571 B1 | | 11/2001 | Norton | 73/862.637 |
| 6,336,371 B1 | | 1/2002 | O'Boyle | 73/865.9 |
| 6,356,200 B1 | | 3/2002 | Hamada et al. | 340/667 |
| 6,363,793 B2 | | 4/2002 | O'Boyle | 73/828 |
| 6,364,352 B1 | | 4/2002 | Norton | 280/735 |
| 6,400,145 B1 | | 6/2002 | Chamings et al. | 324/207.26 |
| 6,405,607 B2 | | 6/2002 | Faigle et al. | 73/862.391 |
| 6,450,534 B1 | | 9/2002 | Blakesley et al. | 280/801.1 |
| 6,454,304 B1 | | 9/2002 | Steffens, Jr. | 280/801.1 |
| 6,481,750 B1 | | 11/2002 | Kalina et al. | 280/801.1 |
| 6,508,114 B2 | * | 1/2003 | Lawson | 73/159 |
| 6,520,032 B2 | | 2/2003 | Resh et al. | 73/862.472 |
| 6,554,318 B2 | | 4/2003 | Kohut et al. | 280/801.1 |
| 6,566,869 B2 | | 5/2003 | Chamings et al. | 324/207.26 |
| 2001/0042981 A1 | | 11/2001 | Kohut et al. | 280/801.1 |
| 2001/0054323 A1 | | 12/2001 | Faigle et al. | 73/862.391 |
| 2002/0024205 A1 | | 2/2002 | Curtis et al. | 280/733 |
| 2002/0035878 A1 | | 3/2002 | Norton | 73/862.391 |
| 2002/0056975 A1 | | 5/2002 | Yoon et al. | 280/735 |
| 2002/0062688 A1 | | 5/2002 | Lawson | 73/159 |
| 2002/0134590 A1 | | 9/2002 | Wolfe et al. | 177/144 |
| 2002/0139196 A1 | | 10/2002 | Resh et al. | 73/827 |
| 2002/0145422 A1 | | 10/2002 | Chamings et al. | 324/207.26 |
| 2002/0171234 A1 | | 11/2002 | Stephen et al. | 280/735 |
| 2002/0189365 A1 | | 12/2002 | Blakesley et al. | 73/826 |
| 2003/0024326 A1 | | 2/2003 | Blakesley et al. | 73/862.391 |
| 2003/0024327 A1 | | 2/2003 | Garver et al. | 73/862.393 |
| 2003/0033885 A1 | | 2/2003 | Knox et al. | 73/777 |
| 2003/0060997 A1 | | 3/2003 | Iiyes | 702/127 |
| 2003/0070846 A1 | | 4/2003 | Wolfe et al. | 177/144 |

* cited by examiner

SEAT BELT TENSION SENSOR

CROSS REFERENCE TO RELATED APPLICATIONS

The instant application claims the benefit of prior U.S. Provisional Application Serial No. 60/387,136 filed on Jun. 7, 2002, which is incorporated herein by reference.

BRIEF DESCRIPTION OF DRAWINGS

In the accompanying drawings:

FIG. 6a illustrates a top view of a seat belt tension sensor in accordance with the first embodiment of the second aspect;

FIG. 6b illustrates a side view of a seat belt tension sensor in accordance with the first embodiment of the second aspect;

FIG. 7b illustrates a top view of a seat belt tension sensor in accordance with the second embodiment;

FIG. 8 illustrates an isometric view of a seat belt tension sensor in accordance with a third embodiment of the second aspect;

FIG. 16b illustrates an axis system associated with FIG. 16a.

DETAILED DESCRIPTION

There exists a need for measuring a tensile load in a flexible load bearing element, such as a webbing, cable, rope or thread. As an example, there exists a need to measure a tensile load in a seat belt used in vehicular safety restraint system, wherein the seat belt load measurement can be used to distinguish a type of object secured by the seat belt, or can be used to compensate for the affect of seat belt loads upon a measurement of seat weight from a seat weight sensor in the seat base. North American automobile manufacturers must meet requirements in the Federal Motor Vehicle Safety Standard 208, published by NHTSA, which requires that all motor vehicles manufactured after 2006 be equipped with an automatic airbag suppression system that can classify the occupant by weight range, e.g. with a weight sensor in the passenger seat.

Figure 1:
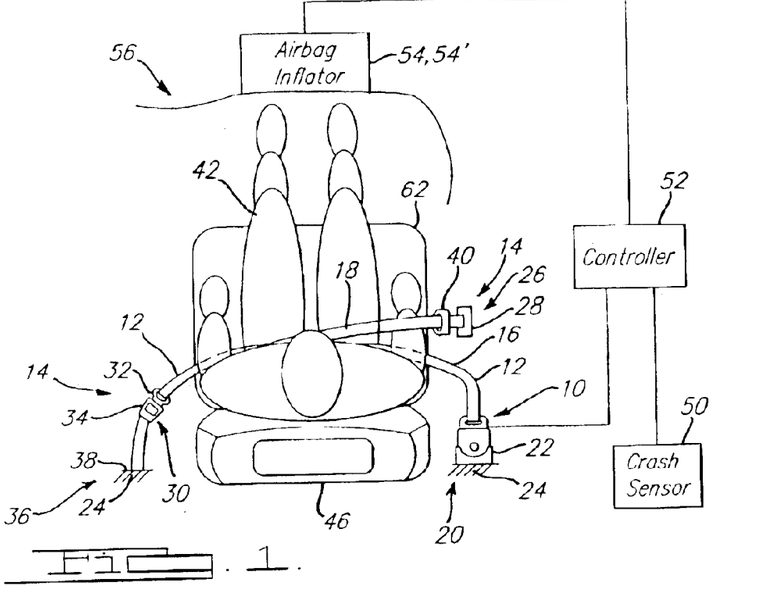
FIG. 1 illustrates a top-view of an occupant in a vehicle seat wearing a seat belt, wherein the seat belt is operatively connected to a seat belt tension sensor.

Referring to FIG. 1, a seat belt tension sensor 10 is operatively coupled to a webbing 12 of a seat belt 14, for measuring a tensile load therein.

The seat belt 14 illustrated in FIG. 1 generally known as a "three-point" seat belt with a continuous loop lap/shoulder belt—comprises a lap belt portion 16 and a shoulder belt portion 18, wherein one end of the lap belt portion 16 the seat belt 14 is attached at a "first point" 20 to a first anchor 22 secured to the vehicle frame 24, one end of the shoulder belt portion 18 is attached at a "second point" 26 to a seat belt retractor 28 secured to the vehicle frame 24, and the other ends of the lap belt portion 16 the shoulder belt portion 18 are located where the seat belt 14 passes through a loop 30 in a latch plate 32 that engages with a buckle 34 that is attached at a "third point" 36 to a second anchor 38 secured to the vehicle frame 24. The shoulder belt portion 18 passes through a "D-ring" 40 operatively connected to the vehicle frame 24 that guides the shoulder belt portion 18 over a shoulder of the occupant 42.

The seat belt retractor 28 has a spool that either provides or retracts webbing 12 as necessary to enable the seat belt 14 to placed around the occupant 42 sufficient to engage the latch plate 32 with the buckle 34, and to remove excess slack from the webbing 12. The seat belt retractor 28 provides a nominal tension in the seat belt 14 so that, responsive to a crash that causes the seat belt retractor 28 to lock the webbing 12 thereby preventing further withdrawal, the occupant 42 is restrained by the seat belt 14 relatively earlier in the crash event than would occur had there been slack in the seat belt 14. During the crash event, when restraining the occupant 42, the webbing 12 of the seat belt 14 can be exposed to a relatively high tensile load, the magnitude of which depends upon the severity of the crash and the mass of the occupant 42.

Figure 2:
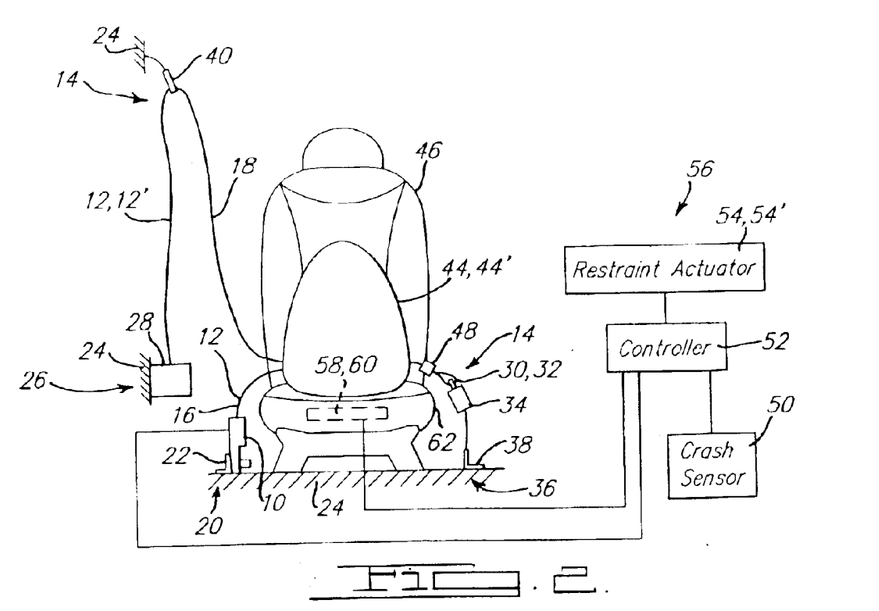
FIG. 2 illustrates a front-view of a vehicle seat upon which a child seat is secured by a seat belt, wherein the seat belt is operatively connected to a seat belt tension sensor and the vehicle seat incorporates a seat weight sensor.

Referring to FIG. 2, the lap belt portion 16 of a seat belt 14 may also be used to secure a child seat 44, such as a rear facing infant seat 44', to the vehicle seat 46, wherein a locking clip 48 may be used to prevent the shoulder belt portion 18 from sliding relative to the lap belt portion 16 proximate to the latch plate 32. In this case, the lap belt portion 16 is typically secured relatively tight with an associated tensile load greater than the associated comfort limit for an adult so as to hold the child seat 44 firmly in the vehicle seat 46 by compressing the seat cushion thereof, and the shoulder belt portion 18 is not otherwise relied upon for restraint.

Accordingly, the tensile load in the webbing 12 of the seat belt 14 can be used to discriminate an object on the vehicle seat 46, wherein a tensile load greater than a threshold would be indicative of a child seat 44. Referring to FIGS. 1 and 2, the seat belt tension sensor 10 is operatively coupled to a lap belt portion 16 of a webbing 12 of a seat belt 14 at a particular seating location. The seat belt tension sensor 10 and a crash sensor 50 are operatively coupled to a controller 52 that is adapted to control the actuation of a restraint actuator 54 e.g., an air bag inflator 54'—of a safety restraint system 56 located so as to protect an occupant at the particular seating location. If the tensile load sensed by the seat belt tension sensor 10 is greater than a threshold, then the restraint actuator 54 is disabled by the controller 52 regardless of whether or not a crash is detected by the crash sensor 50. If the tensile load sensed by the seat belt tension sensor 10 is less than a threshold, then the restraint actuator 54 is enabled by the controller 52 so that the restraint actuator 54 can be actuated responsive to a crash detected by the crash sensor 50. Alternately, for a controllable restraint actuator 54, e.g. a multi-stage air bag inflator 54', the timing and number of inflator stages inflated can be controlled to effect a reduced inflation rate rather than disabling the air bag inflator 54' responsive to the seat belt tension sensor 10 sensing a tensile load greater than a threshold.

Referring to FIG. 2, a seat belt tension sensor 10 may be used in conjunction with at least one other occupant sensor 58, e.g. a seat weight sensor 60, to control the actuation of a safety restraint system 56. The seat weight sensor 60 may operate in accordance with any of a variety of known technologies or embodiments, e.g. incorporating a hydrostatic load sensor, a force sensitive resistor, a magnetostrictive sensing elements, or a strain gage load sensor, which, for example, either measure at least a portion of the load within the seat cushion 62, or measure the total weight of the seat. In either case, a tensile load in the seat belt 14 that is reacted by the vehicle frame 24 acts to increase the load upon the seat cushion 62, thereby increasing the apparent load sensed by the seat weight sensor 60. The apparent load is increased by each reaction force, so that a given tensile load in the seat belt 14 could increase the apparent load sensed by the seat weight sensor 60 by as much as twice the magnitude of the tensile load. Accordingly, in a system with both a seat belt tension sensor 10 and a seat weight sensor 60, the seat weight measurement from the seat weight sensor 60 can be compensated for the effect of tensile load in the seat belt 14 so as to provide a more accurate measure of occupant weight, by subtracting, from the seat weight measurement, a component of seat weight caused by, or estimated to have been caused by, the tensile load measured by the seat belt tension sensor 10. If the seat weight measurement from the seat weight sensor 60 is not compensated for the effect of the tensile load in the seat belt 14, a child seat 44 secured to a vehicle seat 46 with a seat belt 14 could cause a load on the seat weight sensor 60 that is sufficiently great to approximate that of a small adult, so that an uncompensated seat weight measurement might cause the associated restraint actuator 54 to be erroneously enabled in a system for which the restraint actuator 54 should be disabled when a child seat 44 is on the vehicle seat 46.

In a system that compensates for the affect of seat belt tension on an occupant sensor 58, the seat belt tension sensor 10, the occupant sensor 58,—e.g. a seat weight sensor 60,—and a crash sensor 50 are operatively coupled to a controller 52 that is adapted to control the actuation of a restraint actuator 54 e.g., an air bag inflator 54'—of a safety restraint system 56 located so as to protect an occupant at the particular seating location. If the tensile load sensed by the seat belt tension sensor 10 is greater than a threshold, then the restraint actuator 54 is disabled by the controller 52 regardless of whether or not a crash is detected by the crash sensor 50 or regardless of the measurement from the occupant sensor 58. If the tensile load sensed by the seat belt tension sensor 10 is less than a threshold, then the restraint actuator 54 is enabled or disabled by the controller 52 responsive to a measurement from the occupant sensor 58, which may be compensated responsive to the tensile load sensed by the seat belt tension sensor 10. If the restraint actuator 54 is enabled, then the restraint actuator 54 can be actuated responsive to a crash detected by the crash sensor 50. Alternately, for a controllable restraint actuator 54, e.g. a multi-stage air bag inflator 54', the timing and number of inflator stages inflated can be controlled to effect a reduced inflation rate rather than disabling the air bag inflator 54' responsive to measurements from the occupant sensor 58 and the seat belt tension sensor 10.

Figure 3:
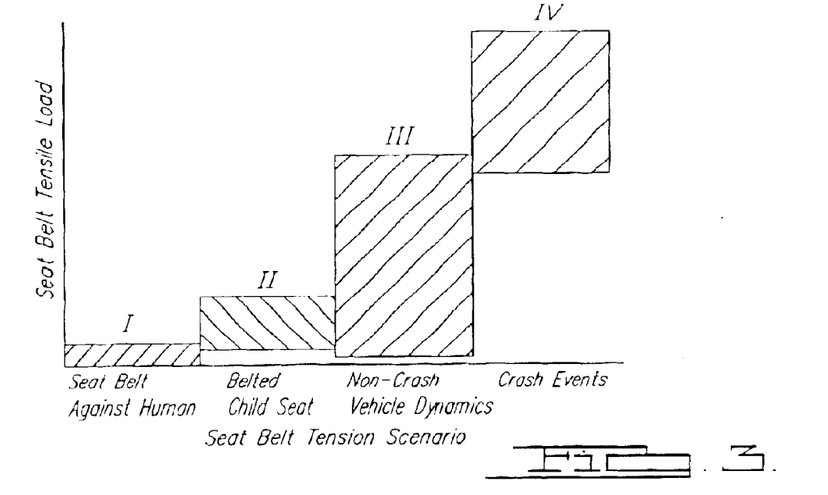
FIG. 3 illustrates scenarios associated with various seat belt tensile load ranges.

Referring to FIG. 3, the loads to which a seat belt 14 is normally exposed can be classified into four ranges as follows: 1) a low range (I) comprising tensile loads associated with the seat belt 14 being placed directly around a human, 2) a low-intermediate range (II) comprising tensile loads associated with the restraint a child seat 44, 3) a high-intermediate range (III) comprising loads associated with non-crash vehicle dynamics, e.g. braking or rough roads, and 4) a high range (IV) comprising tensile loads associated with restraint forces of a crash event. The low range (I), for example, would normally be limited by the maximum tensile load that an occupant 42 could comfortably withstand. The low-intermediate range (II), for example, would normally be limited by the maximum tensile load that a person could apply to the seat belt 14 while securing a child seat 44 to the vehicle seat 46. Notwithstanding that the seat belt 14 and associated load bearing components can be subject to the high range (IV) tensile loads, a seat belt tension sensor 10 would be useful for controlling a safety restraint system 56 if it were capable of measuring low-intermediate range (II) tensile loads associated with securing a child seat 44 to a vehicle seat 46.

Figure 4A:
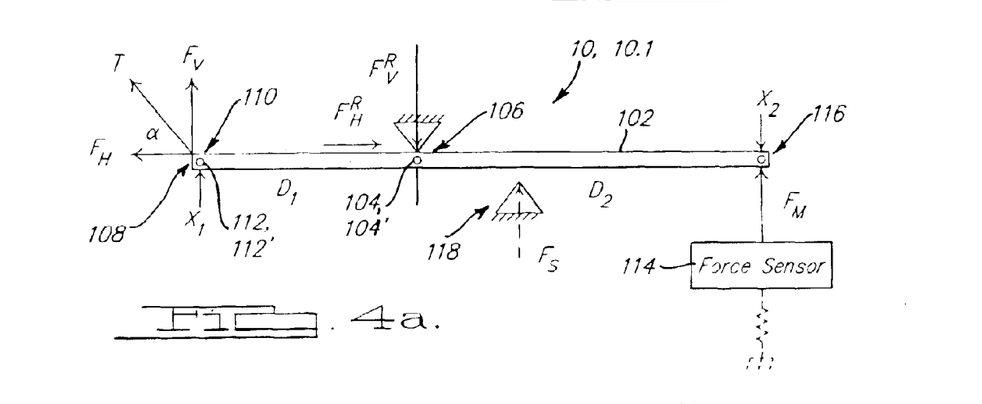
FIG. 4a illustrates a free body diagram of a first aspect of a seat belt tension sensor.
Figure 4B:
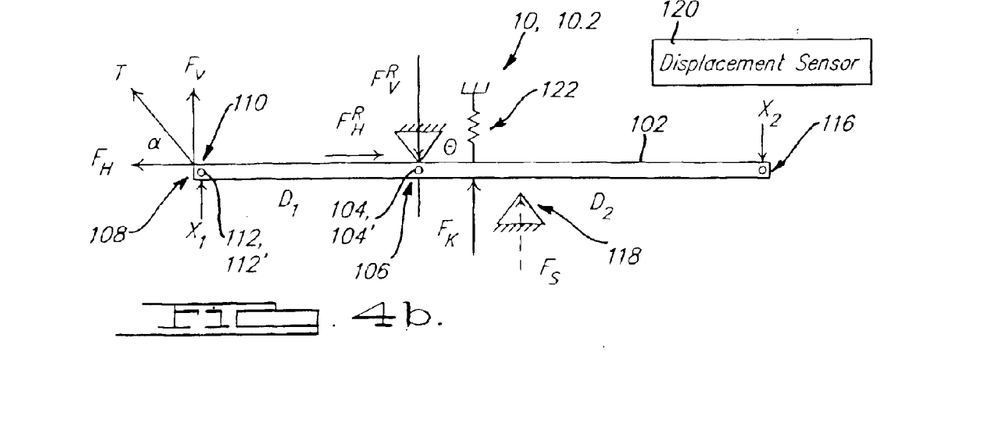
FIG. 4b illustrates a free body diagram of a second aspect of a seat belt tension sensor.

Referring to FIGS. 4a and 4b, the seat belt tension sensor 10 generally comprises a lever 102 that is adapted to rotate about a first pivot 104, e.g. a first pin 104', at a first location 106, responsive to a tension load T applied by the seat belt webbing 12 and operatively coupled to a webbing attachment 108 that is either operatively coupled to or a part of the lever 102 at a second location 110. For example, the webbing attachment 108 may comprise a separate element that is pivoted about second pivot 112, e.g. a second pin 112', at the second location 110 on the lever 102 so that the tension load T is directed substantially through the second location 110, wherein the second location 110 is a separated from the first location 106 by a distance $D_1$. Accordingly, the second pivot 112 provides for the tension load T to effectively act as a point load with substantially no associated applied moment—at the second location 110. A generally oblique tension load T at an angle α from the axis of the lever 102 can be decomposed into an axial tension load component $F_H$ and a transverse tension load component $F_V$. The axial tension load component $F_H$ is reacted by a corresponding axial reaction load component $F^R_H$ at the first pivot 104, and the transverse tension load component $F_V$ generates a torque on the lever 102 about the first pivot 104.

Referring to FIG. 4a, in accordance with a first aspect of the seat belt tension sensor 10.1, the tension load T is sensed by a force sensor 114 that operatively engages the lever 102 at a third location 116 separated from the first location 106 by a distance $D_2$, wherein the associated force $F_M$ measured by the force sensor 114 is given by:

$$F_M = F_v \cdot \frac{D_1}{D_2} = T \cdot \sin(\alpha) \cdot \frac{D_1}{D_2}$$

Accordingly, the first aspect of the seat belt tension sensor 10.1 with the lever 102 substantially horizontal—provides for measuring a vertical component corresponding to the transverse tension load component $F_V$—of the seat belt tension load T; which, for example, can be beneficially used to compensate for seat belt induced loading of a seat weight sensor 60, as described hereinabove. The force sensor 114 may be decoupled from axial loading by the lever 102, e.g. that might otherwise result from a deflection of the first pivot 104 responsive to an axial tension load component $F_H$, e.g. with a slotted connection therebetween so that the force sensor 114 and lever 102 can slide with respect to one another responsive to an axial displacement of the lever 102. The ratio of the force $F_M$ measured by the force sensor 114 to the tension load T can be modified by adjusting either of the distances $D_1$ or $D_2$.

The seat belt tension sensor 10.1 can be adapted to sense loads over a range that is substantially less that the associated range of tension load T, wherein the force sensor 114, e.g. a strain gaged sensing element, either incorporates or is provided with an associated compliance $K_F$ that provides for an associated rotational displacement of the lever 102 over the load range of interest, and the seat belt tension sensor 10.1 is further provided with a stop 118 that prevents further rotational displacement and reacts against additional loading. For example, whereas the seat belt tension load T may be thousands of pounds, the force sensor 114 might be adapted to sense only about the first 30 pounds so as to provide for detecting a child seat secured by the seat belt. Accordingly, the force sensor 114 can be adapted to provide greater sensitivity over a relatively narrow range of loads, and need not be adapted to support the full range of loads, which are otherwise reacted by the webbing attachment 108, the second pivot 112, the, the first pivot 104, and the stop 118, each of which would be designed and constructed accordingly. For example, for a force sensor 114 incorporating a thin-film strain gage sensing element, the stop 118 can be adapted so as to prevent the lever 102 from rotating beyond the point that would cause the thin-film strain gage to be over-stressed, so that the thin-film strain gauge can be adapted to provide for sensitivity over the associated measurement range. For example, the first pivot 104 (e.g. an associated bushing thereof) can be adapted to incorporate the stop 118. Other types of strain sensors, e.g. a silicon based strain gage, might be sufficiently strong and provide for sufficient range and sensitivity so as to preclude the need for a stop 118.

Referring to FIG. 4b, in accordance with a second aspect of the seat belt tension sensor 10.2, the tension load T is sensed by a displacement sensor 120 that is operatively associated with the lever 102 at the third location 116 and senses the displacement $X_2$ thereat. The seat belt tension sensor 10.2 further incorporates a compliant element, e.g. a spring 122, that provides for a calibration thereof. The spring 122 can be any type of spring that is responsive to rotational motion of the lever 102, e.g. a torsion spring, a compression spring, a tension spring or a torsion bar. The radial deflectionÎ, of the lever 102 responsive to the transverse tension load component $F_V$ is given by:

$$\theta = \frac{D_1 \cdot F_v}{K_\theta} = \frac{D_1 \cdot T \cdot \sin(\alpha)}{K_\theta}$$

where $K_{\hat{p}}$ is the torsional spring constant in units of torque/radian. The transverse deflection of the third location 116 is then given by:

$$x_2 = D_2 \cdot \sin(\theta)$$

For a torsion spring, the transverse tension load component $F_V$ responsive to a transverse deflection $x_n$ at distance $D_n$ from the first pivot 104 is given by:

$$F_v = \frac{d_2^4 \cdot E}{64 \cdot d_1 \cdot D_1 \cdot N} \arcsin\left(\frac{x_n}{D_n}\right)$$

where $d_1$=diameter of torsion spring coil; N=number of coils; $d_2$=diameter of torsion spring wire; and E=Elastic Modulus of the spring material.

The second aspect of the seat belt tension sensor 10.2 can be adapted to sense loads over a range that is substantially less that the associated range of tension load T by adapting the torsional spring constant $K_{\hat{p}}$ and the range of the displacement sensor 120 to accommodate the particular load measurement range, and to incorporate a stop 118 that is adapted to engage the lever 102 at the upper bound of the measurement range. Accordingly, the spring 122 would not be subjected to loads greater than those sufficient to deflect the lever 102 so as to engage the stop 118.

Figures 5, 5A:
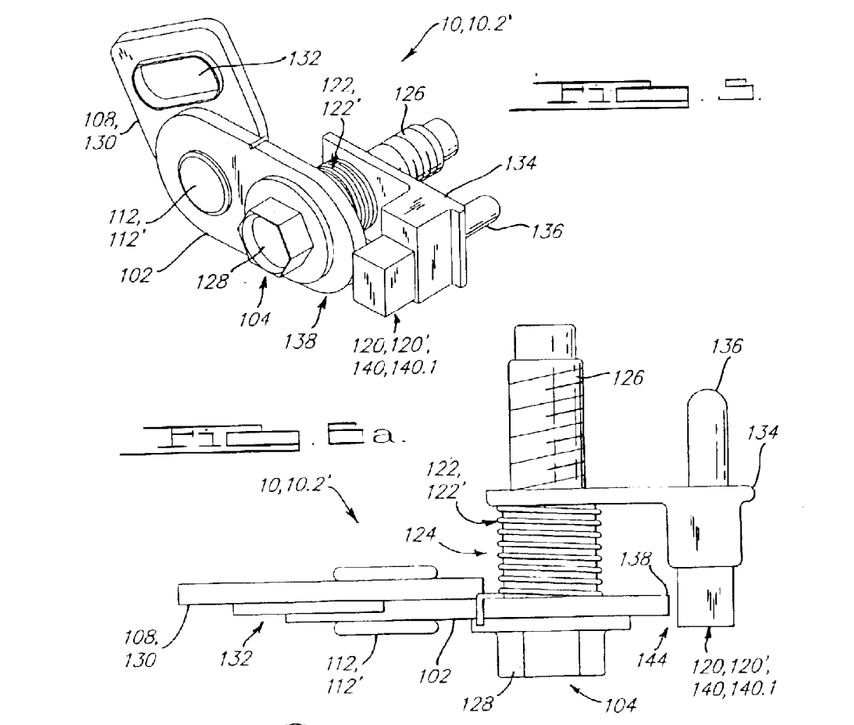
FIG. 5 illustrates an isometric view of a seat belt tension sensor in accordance with a first embodiment of the second aspect.
Figure 5B:
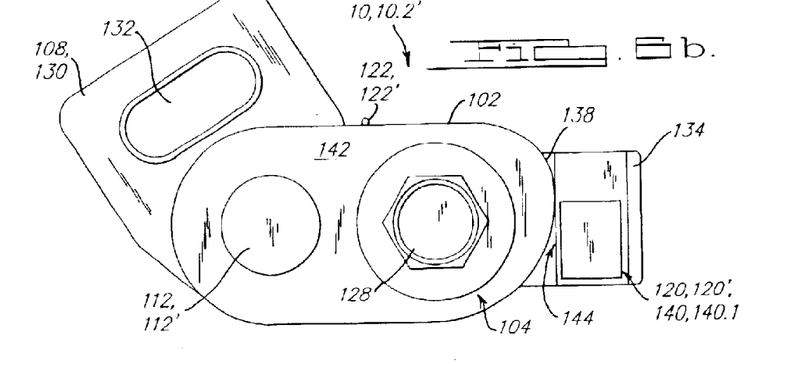

Referring to FIGS. 5, 6a and 6b, a first embodiment of the second aspect of the seat belt tension sensor 10.2' comprises a lever 102 that pivots about a bushing 124 constituting a first pivot 104, wherein the bushing 124 is operatively coupled to the lever 102 by an anchor bolt 126 that is attached to the vehicle frame 24 e.g. the vehicle B-pillar—or other support element. For example, the bushing 124 can be made of a relatively low-friction or self-lubricating material so that the necessary torque on the lever 102 to overcome friction between the lever 102 and the bushing 124 is less than the corresponding torque associated the desired resolution of tension load T. Furthermore, the anchor bolt 126 may be similar to a conventional seat belt anchor bolt, so as to provide for substituting the seat bell tension sensor 10.2' for a conventional seat belt anchorage. The anchor bolt 126 is adapted to support the full load of the seat belt 14. The head 128 of the anchor bolt 126 is sufficiently broad so as to capture the lever 102 on the bushing 124 and provide lateral support thereto.

The seat belt tension sensor 10.2' incorporates a webbing attachment 108 comprising a webbing attachment plate 130 operatively connected to the lever 102 with a second pivot 112, e.g. a second pin 112', e.g. by loosely riveting the second pin 112', wherein the center of the second pivot 112 is located a distance $D_1$ from the center of the first pivot 104. The webbing attachment plate 130 comprises a webbing attachment opening 132 through which a webbing 12 of a seat belt 14 is looped and sewn back onto itself. The second pin 112' may be adapted so as to be removable or replaceable, so as to either facilitate service, or to provide for adapting an existing seat belt anchor plate as a webbing attachment plate 130 of a seat belt tension sensor 10.2', e.g. as an after-market upgrade to an existing seat belt system, or to provide for replacing the seat belt 14 without having to replace the remaining elements of the seat belt tension sensor 10.2. The second pivot 112 enables the webbing attachment plate 130 to freely rotate relative to the lever 102 so that the seat belt tension force is applied as a point load at the second location 110, so that with the lever 102 in a substantially horizontal position, the resulting torque on the lever 102 provides an indication of the associated vertical load component of the associated seat belt tension load T.

The seat belt tension sensor 10.2' further comprises a reaction element 134 which incorporates a mounting hole at a first location that is adapted to engage either the bushing 124 or the anchor bolt 126, and which incorporates an anti-rotation post 136 at a second location and adapted to engage a corresponding hole in the vehicle frame 24 e.g. the vehicle B-pillar—or other support element. For example, the reaction element 134 may be adapted to incorporate the bushing 124 as an integral part thereof. Accordingly, the reaction element 134 is held stationary with respect to the vehicle by the anchor bolt 126 and anti-rotation post 136, and the rotation of the reaction element 134 is restrained by the combination of the anchor bolt 126 at the first location of the reaction element 134, and the anti-rotation post 136 at the second location of the reaction element 134. A torsion spring 122' is operatively coupled between the lever 102 and the reaction element 134 and is adapted to provide a torsional spring force therebetween responsive to a rotation of the lever 102 with respect to the reaction element 134. More particularly, the torsion spring 122' is located around the bushing 124 between the lever 102 and the reaction element 134, wherein one end of the torsion spring 122' incorporates a first arm that engages the lever 102, and the other end of the torsion spring 122' incorporates a second arm that engages the reaction element 134 so that the torsional spring force increases with increasing rotational displacement responsive to the seat belt tension load T.

The seat belt tension sensor 10.2' incorporates a displacement sensor 120' for sensing the rotational position of the lever 102 relative to the reaction element 134. For example, as illustrated in FIG. 6b, an edge 138 of the lever 102 is shaped so that the distance therefrom to a proximate proximity sensor 140 operatively coupled to the reaction element 134 is responsive to the rotation angle $\hat{I}$, of the lever 102 relative to the reaction element 134. The proximity sensor 140 may, for example, comprise a back-biased Hall-effect sensor 140.1 (i.e. a Hall-effect sensor in combination with a magnet), a back-biased GMR (Giant magneto-resistive) sensor, another type of magnetic sensor e.g. an eddy current sensor,—an optical sensor, a capacitive sensor, a non-contact rotary sensor, or a position sensor adapted to measure the position of a follower adapted to follow the profile of the edge 138 of the lever 102. The displacement sensor 120' could also comprise an encoder-type sensor, e.g. either optical or magnetic, with a face 142 or edge 138 of the lever 102 encoded with rotational position information that cooperates with a sensor operatively coupled to the reaction element 134. In the embodiment illustrated in FIGS. 5, 6a and 6b incorporating a back-biased Hall-effect sensor 140.1, the lever 102 comprises a relatively strong piece of ferromagnetic material that cooperates with the back-biased Hall-effect sensor 140.1, wherein the strength of a magnetic field generated by an associated magnet of the back-biased Hall-effect sensor 140.1 is responsive to the gap 144 between the edge 138 of the lever 102 and an associated Hall-effect sensor element of the back-biased Hall-effect sensor 140.1. The Hall-effect sensor element is responsive to the strength of the magnetic field, and generates an associated signal that together with an associated transfer function provides a measure of the rotation angle $\hat{I}$, of the lever 102, which together with the associated spring constant $K_j$, of the torsion spring 122' provides for determining the associated transverse tension load component $F_V$ of seat belt tension load T.

Alternately, the displacement sensor 120' could be oriented in relation to the lever 102 as illustrated in FIG. 4b, so as to be responsive to the transverse displacement of the lever 102.

Electronic circuitry, e.g. an Applications Specific Integrated Circuit (ASIC), associated with the displacement sensor 120, and an associated connector, may also be mounted on the reaction element 134, e.g. proximate to the displacement sensor 120'.

The length of the bushing 124 is adapted so that with the anchor bolt 126 tightened against the bushing, there is sufficient axial clearance between the adjacent coils of the torsion spring 122' so that lever 102 is free to rotate about the bushing 124 and is not otherwise clamped between the head 128 of the anchor bolt 126 and the torsion spring 122' when the bushing 124 and reaction element 134 are secured to the vehicle frame 24 by the anchor bolt 126.

The lever 102, webbing attachment 108, first 104' and second 112' pins, bushing, 124, and anchor bolt 126 are adapted to withstand maximum expected seat belt loads with sufficient margin of safety and in accordance with associated federal regulations and OEM specifications.

Figure 7A:
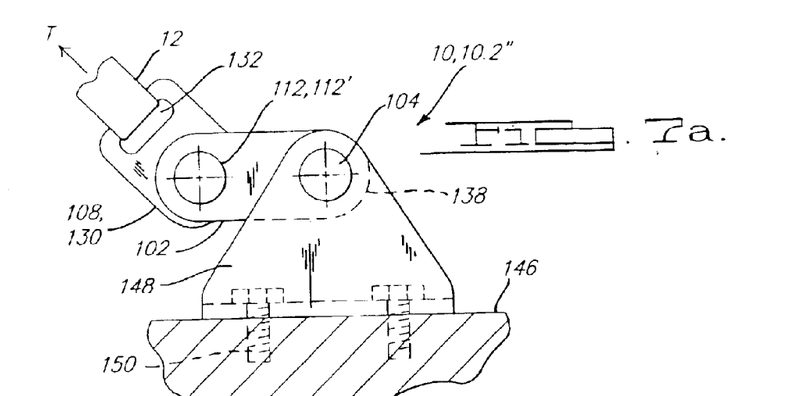
FIG. 7b illustrates a side view of a seat belt tension sensor in accordance with a second embodiment.
Figure 7B:
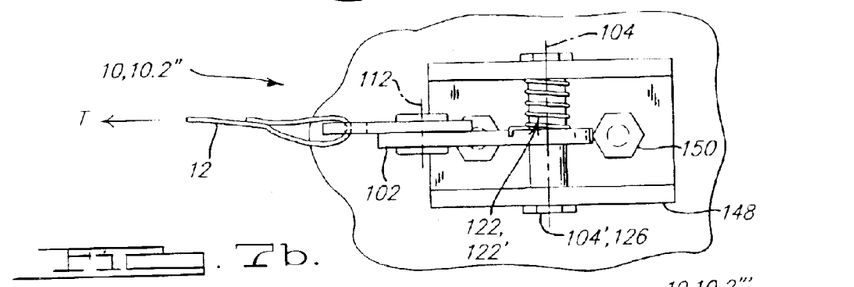
Figure 7C:
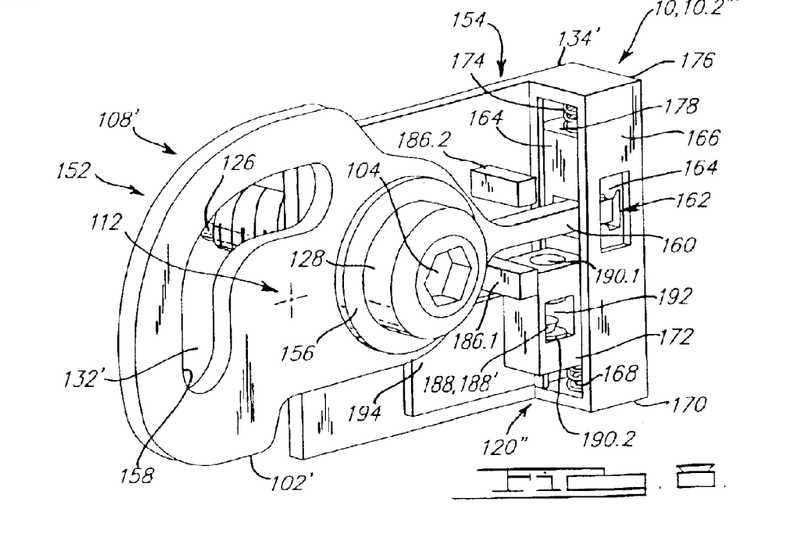

Referring to FIGS. 7a and 7b, in an alternate mounting arrangement, a second embodiment of the seat belt tension sensor 10.2" is mounted to the vehicle floor pan 146 using a U-shaped bracket 148, the sides of which incorporate respective holes that receive the second pivot 112, wherein the lever 102 and torsion spring 122' are located therebetween around the second pivot 112. One arm of the torsion spring 122' engages the U-shaped bracket 148, and the other arm of the torsion spring 122' engages the lever 102, so as to bias the lever 102 towards an unloaded position, and so as to provide a calibrated torque that reacts against the seat belt tension load T. The base of the U-shaped bracket 148 is provided with one or more holes through which the U-shaped bracket 148 is mounted to the vehicle floor pan 146 with one or more anchor bolts 150.

Figure 9:
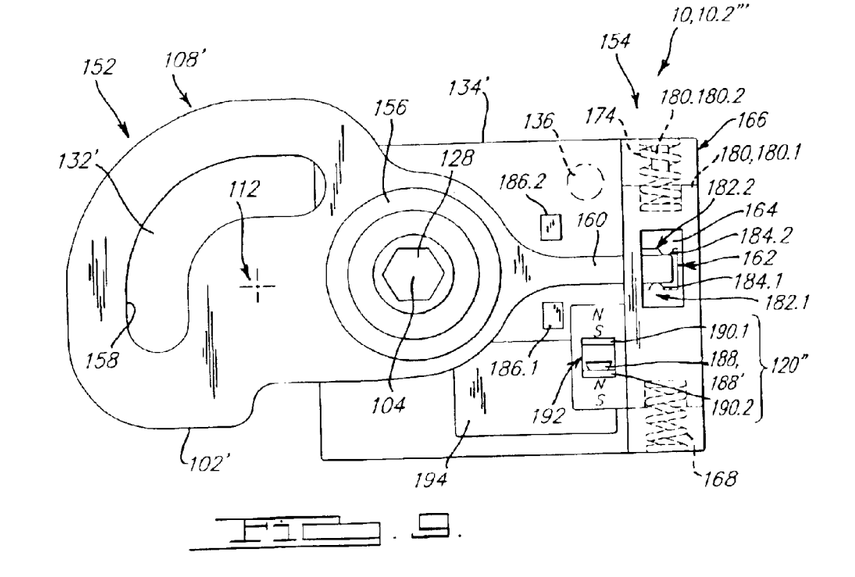
FIG. 9 illustrates a side view of a seat belt tension sensor in accordance with the third embodiment of the second aspect.

Referring to FIGS. 8 and 9, a third embodiment of the second aspect of the seat belt tension sensor 10.2''' comprises a lever 102' that pivots about a first pivot 104 comprising an anchor bolt 126 that is attached to the vehicle frame 24 e.g. the vehicle B-pillar—or other support element. The lever 102' comprises first 152 and second 154 ends, with a hole for the anchor bolt 126 located therebetween. The anchor bolt 126 also extends through a reaction element 134' adjacent to the lever 102'. A pair of washers 156 located on both sides of the lever 102' reduce the friction between the lever 102' and the head 128 of the anchor bolt 126, and between the lever 102' and the reaction element 134'. The anchor bolt 126 is provided with a shoulder than bottoms out against the vehicle frame 24 or other support element, and the length of the shank of the anchor bolt 126 is adapted so that the lever 102' can freely rotate when the anchor bolt 126 is attached to the vehicle frame 24 or other support element.

The first end 152 of the lever 102' incorporates a webbing attachment 108' comprising a webbing attachment opening 132' through which a webbing 12 of a seat belt 14 is looped and sewn back onto itself. The webbing attachment opening 132' is arcuately shaped so that as the lever 102' rotates, the loop of webbing 12 through the webbing attachment opening 132' is free to slide along the arcuately shaped load bearing edge 158 of the webbing attachment opening 132' so that the force on the lever 102' from the webbing 12 has an associated force vector that is substantially directed through a virtual second pivot 112 that is separated from the first pivot 104 by a distance $D_1$.

The second end 154 of the lever 102' incorporates a tang 160 that engages a slot 162 of a slide 164 that is adapted to slide within a slide guide 166 operatively coupled to or incorporated in the reaction element 134'. A first spring 168—e.g. a first helical compression spring—is located between a first end 170 of the slide guide 166 and a first end 172 of the slide 164, and a second spring 174—e.g. a second helical compression spring—is located between a second end 176 of the slide guide 166 and a second end 178 of the slide 164. The first 170 or second 176 ends of the slide guide 166, or the first 172 or second 178 ends of the slide 164 may be adapted with respective spring guides 180 to retain the respective springs. For example, the spring guide(s) 180 may be either external 180.1 or internal 180.2 i.e. either a bore or pin respectively that retains a corresponding end of the first 168 or second 174 spring.

Referring to FIG. 9, the first 182.1 and second 182.2 sides of the slot 162 in the slide 164 are adapted with respective first 184.1 and second 184.2 raised surfaces—e.g. raised cylindrical surfaces—that respectively engage the tang 160 at respective first and second locations that are at different distances from the first pivot 104 so as to prevent the tang 160 from binding in the slot 162 as the lever 102' is rotated over its operating range. The first raised surface 184.1 contacts the tang 160 at a distance $D_2$ from the first pivot 104.

The reaction element 134' incorporates first 186.1 and second 186.2 stops that are located so as to engage the tang 160 at respective extremum in the range of motion of the lever 102' responsive to positive and negative tension load T respectively, so as to limit the amount of load that can be transferred from the lever 102'l tang 160 to the slide 164, thereby enabling the slide 164 to be made of plastic so as to reduce weight and cost. Alternately, the slide 164 could be constructed to withstand the full range of load that would result from a corresponding full range of tension load T, thereby precluding the need the first 186.1 and second 186.2 stops.

The reaction element 134' incorporates an anti-rotation post 136 extending from the back side thereof and displaced from the location of the anchor bolt 126. The anti-rotation post 136 is adapted to engage a corresponding hole in the vehicle frame 24 e.g. the vehicle B-pillar—or other support element, so as to prevent rotation of the reaction element 134' relative thereto.

The seat belt tension sensor 10.2''' incorporates a displacement sensor 120'' comprising a magnetic fieldsensor 188, e.g. a Hall-effect sensor 188' or a GMR sensor, that is located between a pair of magnets 190.1, 190.2 that collectively generate a magnetic field in the gap 192 therebetween. The magnetic fieldsensor 188 is operatively coupled to a printed circuit board (PCB) 194 that is operatively coupled to the reaction element 134'. The magnetic fieldsensor 188 is oriented so that the sensitive axis thereof is substantially aligned with the direction of travel of the slide 164, which is substantially aligned with an axis on which the magnets 190.1, 190.2 i.e. the poles thereof—are aligned. The pair of magnets 190.1, 190.2 are operatively coupled to the slide 164 so as to move therewith responsive to the action of the lever 102' against the slot 162 of the slide 164, and responsive to the action of the first 168 and second 174 springs on the slide 164. The pair of magnets 190.1, 190.2 are adapted so that the strength of the magnetic field therebetween at varies with respect to the location of the magnetic fieldsensor 188 therebetween, so that the signal from the magnetic fieldsensor 188 responsive to the strength of the magnetic field can be used as a measure of the position of the magnetic fieldsensor 188, which correspondingly provides a measure of the position of the slide 164 within the slide guide 166. For example, the poles of the magnets 190.1, 190.2 are arranged so that like poles are facing one another across the gap 192, e.g. S-S or N-N.

In operation of the seat belt tension sensor 10.2''', without a tension load T in the webbing 12 of the seat belt 14, the first 168 and second 174 springs are adapted so as to be in compression, wherein the position of the slide 164 and corresponding compression of the first 168 and second 174 springs and the resulting rotational position of the lever 102'—is determined by the equilibrium of forces from the first 168 and second 174 springs. The first spring 168 is substantially stiffer than the second spring 174 and substantially provides for the calibration of the seat belt tension sensor 10.2'''. The substantially more compliant second spring 174 is provided to remove slack between the ends of the slide 164 and the slide guide 166, so as to reduce the affects of vibration, e.g. to prevent clatter of the slide 164 against the slide guide 166.

Responsive to a tension load T in the webbing 12 of the seat belt 14, the tension load T is transferred to the arcuately shaped load bearing edge 158 of the webbing attachment opening 132' in the lever 102'. The webbing 12 is free to slide along the edge 158 responsive to any circumferential loading thereof, so that the resulting tension load T is substantially radially directed through a virtual second pivot 112 that is separated from the first pivot 104 by a distance $D_1$. The tension load T can be resolved into an axial component and a tangential component, the latter of which generates a torque on the lever 102' about the first pivot 104. The torque on the lever 102' causes the tang 160 to rotate, which being engaged with the slot 162 in the slide 164, causes the slide 164 to slide within the slide guide 166 towards the first end 170 thereof, thereby compressing the first spring 168. The first spring 168 generates a reaction force on the tang 160 that is substantially linearly related to the displacement of the slide 164. As the first spring 168 is compressed, the second spring 174 is extended, and the effective compliance or spring rate acting on the slide 164 is determined by the combined effect of the first 168 and second 174 springs. For the lever 102' positioned so that the tang 160 is not constrained by either the first 186.1 or second 186.2 stops, the displacement of the slide 164 is indicative of the tangential component of tension load T, depending upon the effective compliance of the first 168 and second 174 springs, and upon the distances $D_1$ and $D_2$. If the seat belt tension sensor 10.2''' is oriented so that the tangential component of force is substantially vertical for the range of tension load T of interest, then the resulting signal from the magnetic fieldsensor 188 will provide a measure of the vertical component of tension load T.

In comparison with the first embodiment of the second aspect of the seat belt tension sensor 10.2' described hereinabove, the third embodiment of the second aspect of the seat belt tension sensor 10.2''' has a relatively smaller overall package thickness because a space is not required therein between the lever 102' and the reaction element 134' to accommodate a torsion spring. Furthermore, the first 168 and second 174 springs incorporated in the third embodiment provide for improved linearity and reduced hysteresis in comparison with the torsion spring 122' incorporated in the first embodiment.

Figure 10A:
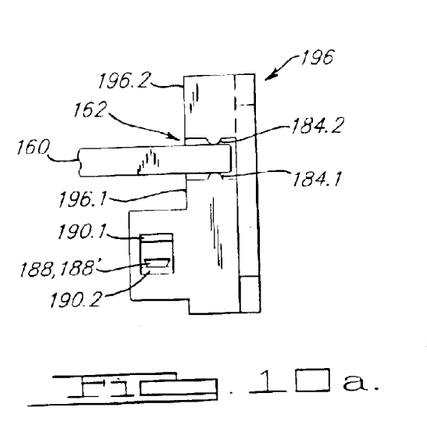
FIGS. 10a and 10b illustrate orthographic views of an alternate slide embodiment.
Figure 10B:
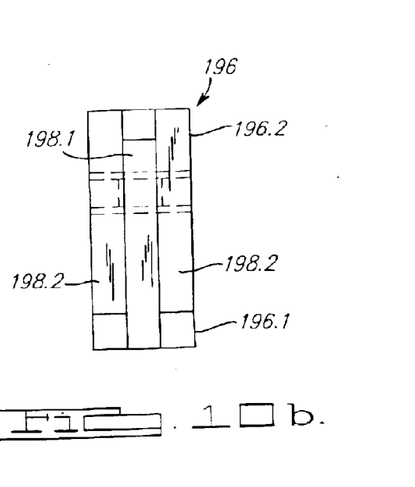

Referring to FIGS. 10a and 10b, an alternate embodiment of the slide 196 comprises mating first 196.1 and second 196.2 portions, each comprising respective fingers 198.1, 198.2 that slideably engage with one another so as to provide for a slot 162 having a width that adapts so as to provide for a continuous engagement of the respective first 184.1 and second 184.2 raised surfaces with the respective sides of the tang 160 regardless of the angle of the lever 102', thereby providing for the elimination of slack between any of the tang 160, the first 196.1 and second 196.2 portions of the slide 196 and the first 168 and second 174 springs, under substantially all conditions. Otherwise, with a single slide 164, there would be a potential for slack to develop between the tang 160 and the mating first 184.1 and second 184.2 raised surfaces as a result of wear. Furthermore, the two-piece slide 196 eliminates the need to offset the locations of the first 184.1 and second 184.2 raised surfaces with respect to one another to as to prevent the tang 160 from binding therewith over the range of rotations of the lever 102'. Yet further, with the two-piece slide 196, the width of the slot 162 is not fixed, and therefore is not subject to an associated manufacturing tolerance that otherwise could increase the associated cost of manufacturing. Similarly, the manufacturing tolerance on the corresponding width of the tang 160 does not affect the amount of slack, and is therefor not associated therewith. The fingers 198.1, 198.2 provide for retaining the separate first 196.1 and second 196.2 portions of the slide 196 within the slide guide 166.

Figure 11A:
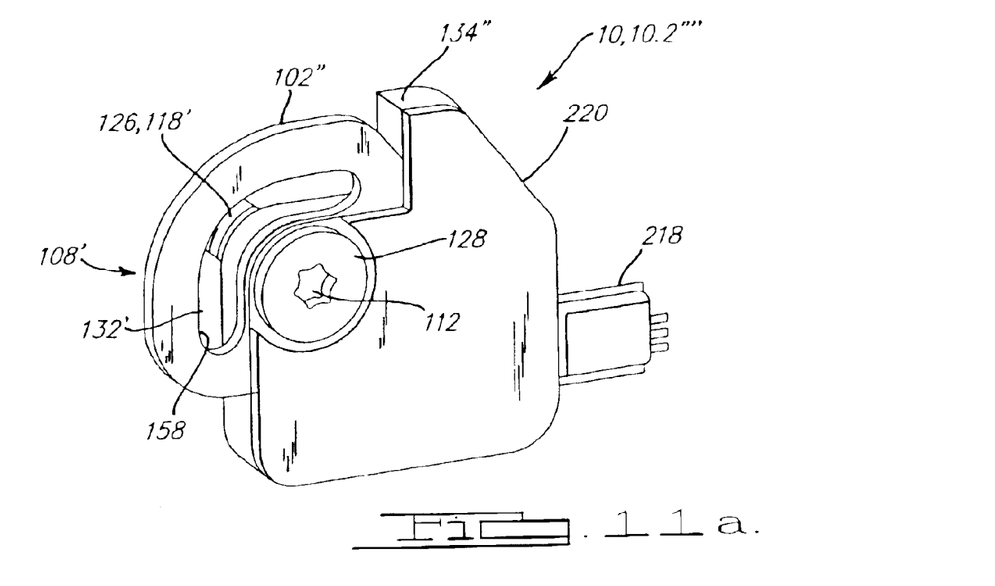
FIGS. 11a and 11b illustrate isometric views of a seat belt tension sensor in accordance with a fourth embodiment of the second aspect.
Figure 11B:
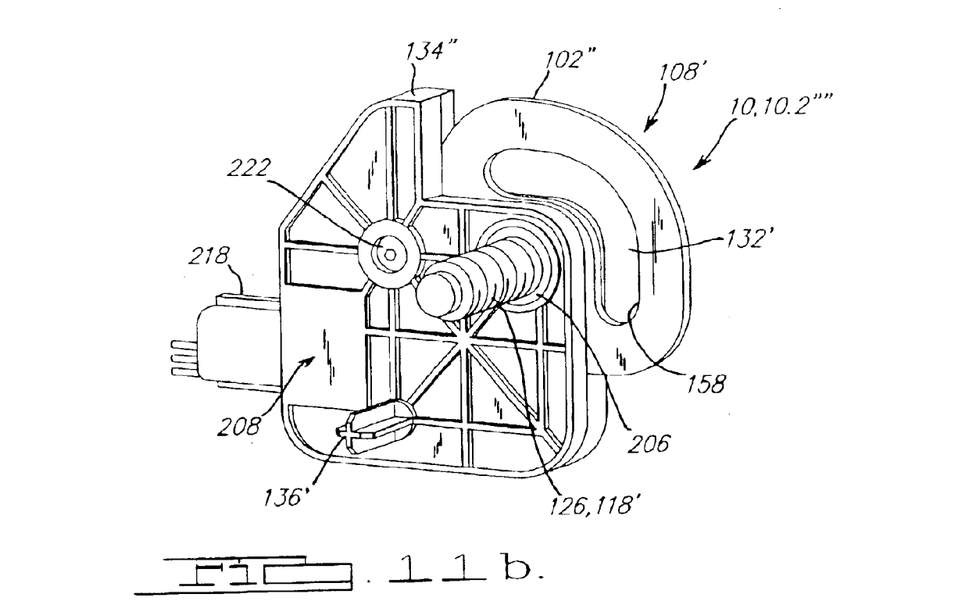

Referring to FIGS. 11a, 11b, 12 and 13, a fourth embodiment of the second aspect of the seat belt tension sensor 10.2"" utilizes the anchor bolt 126 as a bi-directional stop 118' rather than as a first pivot 104 of an associated lever 102", and the lever 102" is adapted to pivot about a first pivot 104 comprising a separate stud 200 depending from an inside surface 202 of an associated reaction element 134". The anchor bolt 126 extends through a slot 204 in the lever 102" and through a bushing portion 206 of the reaction element 134". The head 128 of the anchor bolt 126 captures the lever 102". For example, the head 128 is pan-shaped and incorporates a socket recess (e.g. TORX$^A$®) so as to reduce to profile thereof and thereby reduce the overall profile of the seat belt tension sensor 10.2"". The anchor bolt 126 is attached to the vehicle frame 24 e.g. the vehicle B-pillar—or other support element. The anchor bolt 126 is provided with a shoulder that bottoms out against the vehicle frame 24 or other support element, and the length of the shank of the anchor bolt 126 is adapted so that the lever 102" can slide freely with respect to the anchor bolt 126 when the anchor bolt 126 is attached to the vehicle frame 24 or other support element. Referring to FIG. 11b, the reaction element 134" further incorporates an anti-rotation post 136' depending from an outside surface 208 thereof, that is adapted to engage a corresponding hole in the vehicle frame 24 e.g. the vehicle B-pillar—or other support element, so as to prevent rotation of the reaction element 134" relative thereto.

The lever 102" incorporates a webbing attachment 108' comprising a webbing attachment opening 132' through which a webbing 12 of a seat belt 14 is looped and sewn back onto itself. The webbing attachment opening 132' is arcuately shaped so that as the lever 102" rotates, the loop of webbing 12 through the webbing attachment opening 132' is free to slide along the arcuately shaped load bearing edge 158 of the webbing attachment opening 132' so that the force on the lever 102" from the webbing 12 has an associated force vector that is substantially directed through a virtual second pivot 112 that is separated from the first pivot 104 by a distance $D_1$, and which is located substantially along a center of the slot 204 in the lever 102", so that for a tension load T exceeding the measurement range of the seat belt tension sensor 10.2""—thereby causing the slot 204 of the lever 102" to bottom out against the anchor bolt 126 a substantial majority of the excess tension load T is reacted by the anchor bolt 126, and the amount of load reacted by the bushing portion 206 of the reaction element 134' is relatively small in comparison with the maximum tension load T that can be applied by the webbing 12 to the lever 102". Accordingly, the relatively high tension load T that can be applied by the webbing 12 to the lever 102" are reacted mostly by the anchor bolt 126, and a resulting load-induced wear of either the slot 204 in the lever 102" or the mating portion of the shank of the anchor bolt 126 does not affect the accuracy, resolution, or hysteresis of the seat belt tension sensor 10.2"" as might be the case for other embodiments that utilize the anchor bolt 126 as a first pivot 104.

Figure 12:
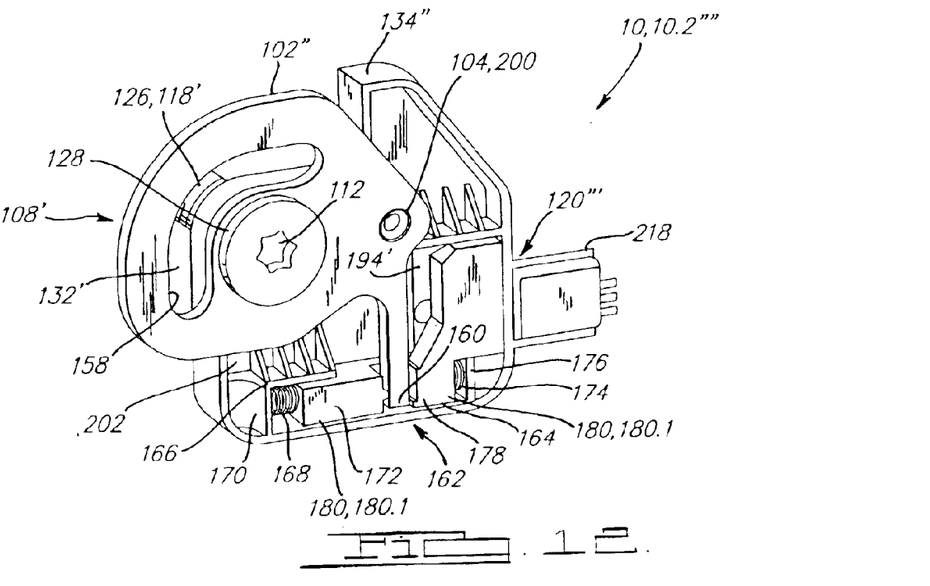
FIG. 12 illustrates an isometric view of a mechanism of the seat belt tension sensor in accordance with the fourth embodiment of the second aspect, with the outside cover removed.

Referring to FIG. 12, the lever 102" comprises a tang 160 that engages a slot 162 of a slide 164 that is adapted to slide within a slide guide 166 operatively coupled to or incorporated in the reaction element 134". A first spring 168—e.g. a first helical compression spring—is located between a first end 170 of the slide guide 166 and a first end 172 of the slide 164, and a second spring 174—e.g. a second helical compression spring—is located between a second end 176 of the slide guide 166 and a second end 178 of the slide 164. The first 170 or second 176 ends of the slide guide 166, or the first 172 or second 178 ends of the slide 164 may be adapted with respective spring guides 180 to retain the respective first 168 and second 174 springs. For example, as for the third embodiment of the seat belt tension sensor 10.2''' illustrated in FIG. 9, the spring guide(s) 180 may be either external 180.1 or internal 180.2 i.e. either a bore or pin respectively that retains a corresponding end of the first 168 or second 174 spring.

Figure 14A:
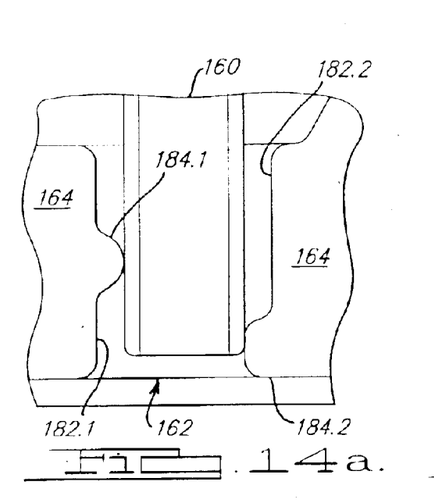
FIG. 14a illustrates a view of the assembly of a tang in a slot of a plunger, in accordance with the fourth embodiment of the second aspect, wherein the tang is in a first position that is substantially normal to the slide.
Figure 14B:
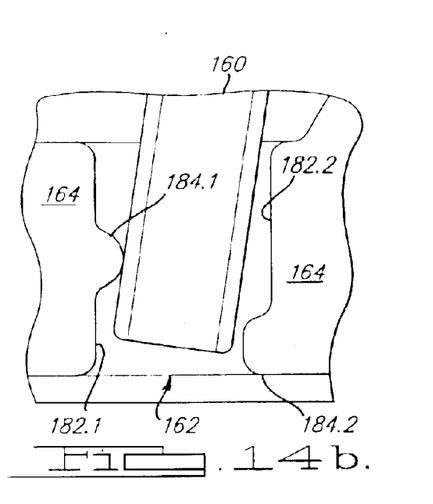
FIG. 14b illustrates a view of the assembly of a tang in a slot of a slide, in accordance with the fourth embodiment of the second aspect, wherein the tang is in a second position that is rotated with respect to the first position.

Referring to FIGS. 12, 14a and 14b, the first 182.1 and second 182.2 sides of the slot 162 in the slide 164 are adapted with respective first 184.1 and second 184.2 raised surfaces that respectively engage the tang 160 at respective first and second locations that are at different distances from the first pivot 104 so as to prevent the tang 160 from binding in the slot 162 as the lever 102" is rotated over its operating range. For example, FIG. 14a illustrates the tang 160 in a first position that is substantially normal to the slide 164, e.g. with the seat belt tension sensor 10.2"" unloaded, and FIG. 14b illustrates the tang 160 in a second position that is rotated relative to the first position responsive to a tension load T applied to the lever 102". The first raised surface 184.1 contacts the tang 160 at a distance $D_2$ from the first pivot 104.

Figure 15:
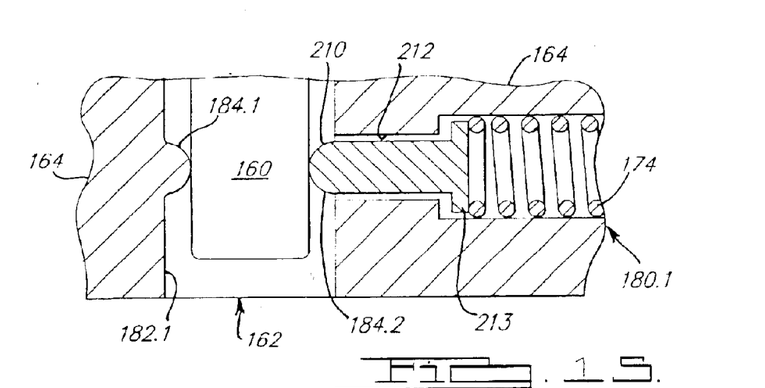
FIG. 15 illustrates an alternate embodiment of a slide.

Referring to FIG. 15, the second raised surface 184.2 is decoupled from the firstraised surface 184.1 with a spring-loaded follower 210 located in a bore 212 extending from the second side 182.2 of the slot 162 through to the cavity of the associated external spring guide 180.1, whereby the associated second spring 174 applies a spring load to the follower 210, which in turn applies a force to the tang 160 that prevents any slack between the tang 160 and either the first raised surface 184.1 or the follower 210 so as to prevent clatter that might result from a vibration of the seat belt tension sensor 10.2"". The locations of the first raised surface 184.1 and the spring-loaded follower 210 along the tang 160 are independent of one another, in contradistinction with the relatively fixed arrangement illustrated in FIGS. 14a and 14b. The follower 210 incorporates a flange 213 that retains the follower 210 within the slide 164 when the tang 160 is removed from the slot 162 thereof.

Figure 13:
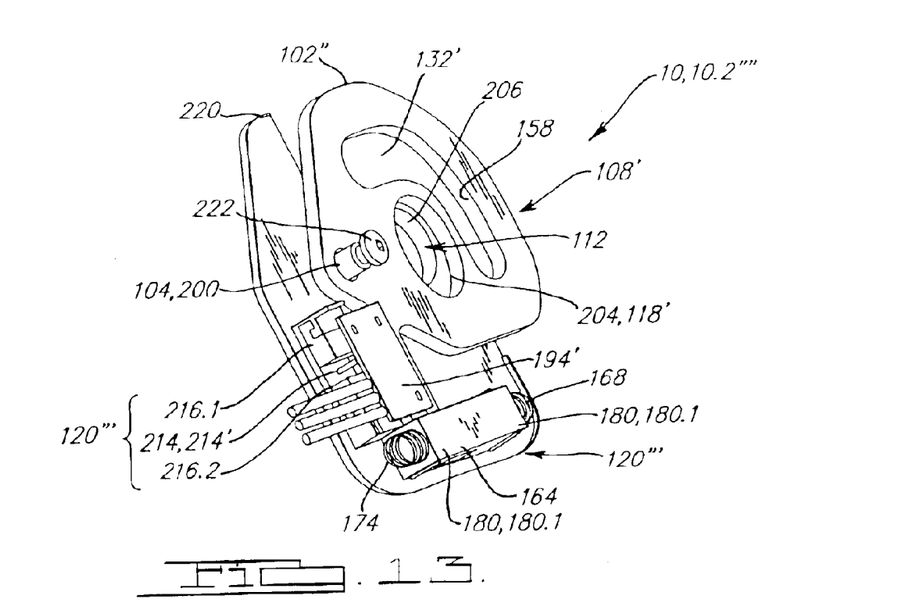
FIG. 13 illustrates an isometric view of the mechanism of the seat belt tension sensor in accordance with the fourth embodiment of the second aspect, with the reaction element removed.

The seat belt tension sensor 10.2"" incorporates a displacement sensor 120'" comprising a magnetic field sensor 214, e.g. a Hall-effect sensor 214', that is located between a pair of magnets 216.1, 216.2 that collectively generate a magnetic field in the gap 192 therebetween. The magnetic field sensor 214 is operatively coupled to a printed circuit board (PCB) 194' that is operatively coupled to the reaction element 134", which may incorporate an integrally-molded connector 218 by which the signals from the printed circuit board (PCB) 194' are connected to external wiring, e.g. an external wiring harness. The magnetic field sensor 214 is relatively fixed with respect to the reaction element 134" and is oriented so that the sensitive axis thereof is substantially normal to the direction of travel of the slide 164. The pair of magnets 216.1, 216.2 are operatively coupled to the slide 164 so as to move therewith responsive to the action of the lever 102"/tang 160 against the slot 162 of the slide 164, and responsive to the action of the first 168 and second 174 springs on the slide 164.

Figure 16A:
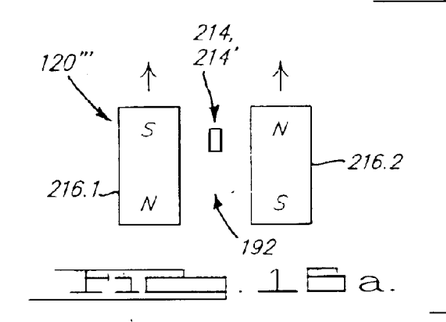
FIG. 16a illustrates an arrangement of a magnetic field sensor and an associated pair of magnets, in accordance with a displacement sensor incorporated in the fourth embodiment of the second aspect.
Figure 16B:
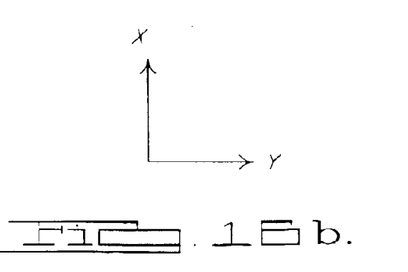

Referring to FIG. 16a, the N-S axes of the magnets 216.1, 216.2 are aligned with the direction of travel, the poles N, S of the magnets 216.1, 216.2 are crossed relative to one another, and the magnetic field sensor 214 is located between the magnets 216.1, 216.2. In accordance with this arrangement, the distance between the magnetic field sensor 214 and either of the magnets 216.1, 216.2 is relatively invariant with respect to the position of the slide 164/magnets 216.1, 216.2 along the direction of travel (X-axis as illustrated in FIG. 16b). Furthermore, with the poles N, S of the magnets 216.1, 216.2 crossed relative to one another, the strength and direction of the Y-axis component of magnetic field—as is measured by the magnetic field sensor 214—is dependent upon the X-axis location between the magnets 216.1, 216.2. Accordingly, the magnetic field sensed by the magnetic field sensor 214 is dependent upon the displacement of the slide 164/magnets 216.1, 216.2 relative to the magnetic field sensor 214/reaction element 134", the linearity of which is improved by having the poles N, S of the magnets 216.1, 216.2 crossed relative to one another.

The anchor bolt 126—in cooperation with the ends of the slot 204—functions as a stop 118', which precludes the need for separate first 186.1 and second 186.2 stops as in the third embodiment of the seat belt tension sensor 10.2'". Accordingly, the forces acting on the reaction element 134" responsive to a tension load T are relatively small in comparison with the maximum tension load T, thereby enabling the reaction element 134" to be constructed of plastic so as to reduce associated manufacturing costs, and thereby reducing the load applied to the tang 160 of the lever 102". Similarly, the forces acting on the slide 164 are also relatively small, so that the slide 164 can also be constructed of plastic so as to reduce associated manufacturing costs. The seat belt tension sensor 10.2"" is enclosed by a cover 220, e.g. made of plastic, that is secured to the reaction element 134" with a screw 222, e.g. a self-tapping screw, from the outside surface 208 thereof, e.g. through the stud 200 about which the lever 102" pivots.

In operation of the seat belt tension sensor 10.2"", without a tension load T in the webbing 12 of the seat belt 14, the first 168 and second 174 springs are adapted so as to be in compression, wherein the position of the slide 164 and corresponding compression of the first 168 and second 174 springs and the resulting rotational position of the lever 102"—is determined by the equilibrium of forces from the first 168 and second 174 springs. The first spring 168 is substantially stiffer than the second spring 174 and substantially provides for the calibration of the seat belt tension sensor 10.2"". The substantially more compliant second spring 174 is provided to remove slack between the ends of the slide 164 and the slide guide 166, so as to reduce the affects of vibration, e.g. to prevent clatter of the slide 164 against the slide guide 166.

Responsive to a tension load T in the webbing 12 of the seat belt 14, the tension load T is transferred to the arcuately shaped load bearing edge 158 of the webbing attachment opening 132' in the lever 102". The webbing 12 is free to slide along the edge 158 responsive to any circumferential loading thereof, so that the resulting tension load T is substantially radially directed through a virtual second pivot 112 that is separated from the first pivot 104 by a distance $D_1$. The tension load T can be resolved into an axial component and a tangential component, the latter of which generates a torque on the lever 102" about the first pivot 104. The torque on the lever 102" causes the tang 160 to rotate, which being engaged with the slot 162 in the slide 164, causes the slide 164 to slide within the slide guide 166 towards the first end 170 thereof, which compresses the first spring 168. The first spring 168 generates a reaction force on the tang 160 that is substantially linearly related to the displacement of the slide 164. As the first spring 168 is compressed, the second spring 174 is extended, and the effective compliance or spring rate acting on the slide 164 is determined by the combined effect of the first 168 and second 174 springs. For the anchor bolt 126 not bottomed-out against an end of the slot 204 in the lever 102", the displacement of the slide 164 is responsive to the tangential component of tension load T, dependent upon the effective compliance of the first 168 and second 174 springs, upon the distances $D_1$ and $D_2$. If the seat belt tension sensor 10.2"" is oriented so that the tangential component of force substantially vertical for the range of tension load T of interest, then the resulting signal from the magnetic field sensor 214 will provide a measure of the vertical component of tension load T.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. An apparatus for measuring a tensile load in a seat belt of a vehicle, comprising:
   a. a lever adapted to rotate about a pivot at a first location on said lever;
   b. a webbing attachment operatively either connected to or a part of said lever, wherein said webbing attachment is adapted to operatively couple with a webbing of the seat belt so as to receive the tensile load therefrom and to transfer said tensile load so as to act on said lever at a second location on said lever, wherein said second location is displaced from said first location and said webbing attachment is adapted to direct said tensile load substantially through a center of rotation at said second location;
   c. a reaction element wherein said reaction element is adapted to inhibit rotation thereof relative to the vehicle when the apparatus is operatively coupled to the vehicle;
   d. a first spring operatively coupled to said lever and adapted to bias said lever about said pivot so as to react against said tensile load when said tensile load is received by said webbing attachment, wherein said first spring is adapted to operate between said reaction element and said lever; and e. a displacement or proximity sensor operatively associated with said lever and said reaction element, wherein said displacement or proximity sensor is responsive to a rotation of said lever with respect to said reaction element.

2. An apparatus for measuring a tensile load in a seat belt of a vehicle as recited in claim 1, wherein the apparatus is mounted in the vehicle so that for at least one operating condition of the seat belt, the torque on said lever resulting from said tensile load in the seat belt is primarily caused by a vertical component of said tensile load relative to the vehicle.

3. An apparatus for measuring a tensile load in a seat belt of a vehicle as recited in claim 1, wherein said webbing attachment is adapted to be rotatable about said second location with respect to said lever responsive to a direction of said tensile load.

4. An apparatus for measuring a tensile load in a seat belt of a vehicle as recited in claim 1, wherein said webbing attachment comprises an arcuate slot in said lever, said webbing of the seat belt operatively engages an edge of said arcuate slot, and said edge has a center of curvature at said second location.

5. An apparatus for measuring a tensile load in a seat belt of a vehicle as recited in claim 1, further comprising a rotation stop adapted to engage said lever when said tensile load exceeds a threshold so as to substantially limit said rotation of said lever.

6. An apparatus for measuring a tensile load in a seat belt of a vehicle as recited in claim 1, wherein said lever is adapted to rotate about an anchor bolt when the apparatus is attached to the vehicle with said anchor bolt.

7. An apparatus for measuring a tensile load in a seat belt of a vehicle as recited in claim 1, wherein said lever and said webbing attachment are adapted so that upon application of said tensile load to said webbing attachment, a line of centers between said pivot and said center of rotation at said second location rotates towards alignment with a line of action of said tensile load on said lever as said tensile load is increased in magnitude sufficient to rotate said lever in opposition to said first spring, whereby a torque on said lever about said pivot becomes negligible when the magnitude of said tensile load exceeds a threshold.

8. An apparatus for measuring a tensile load in a seat belt of a vehicle as recited in claim 1, wherein said reaction element comprises a bore that is adapted to receive an anchor bolt, and said reaction element is operatively further coupled to the vehicle at a location that is displaced from said bore.

9. An apparatus for measuring a tensile load in a seat belt of a vehicle as recited in claim 8, wherein said reaction element comprises an anti-rotation post at a location that is displaced from said bore and which in combination with said anchor bolt through said bore provides for operatively coupling said reaction element to the vehicle so as to inhibit rotation of said reaction element relative to the vehicle.

10. An apparatus for measuring a tensile load in a seat belt of a vehicle as recited in claim 1, wherein said first spring comprises a torsion spring.

11. An apparatus for measuring a tensile load in a seat belt of a vehicle as recited in claim 1, wherein an edge of said lever comprises a contour, said displacement or proximity sensor is operatively coupled to said reaction element, a shape of said contour is adapted so that a distance between said displacement or proximity sensor and said contour is responsive to said rotation of said lever, and said displacement or proximity sensor is responsive to said distance between said displacement or proximity sensor and said contour.

12. An apparatus for measuring a tensile load in a seat belt of a vehicle as recited in claim 11, wherein said lever comprises a ferromagnetic material along said contour and said displacement or proximity sensor comprises a magnetic sensor.

13. An apparatus for measuring a tensile load in a seat belt of a vehicle as recited in claim 12, wherein said magnetic sensor is selected from a back-biased Hall-effect sensor, a back-biased GMR (giant magneto-resistive) sensor and an eddy current sensor.

14. An apparatus for measuring a tensile load in a seat belt of a vehicle as recited in claim 1, wherein said reaction element comprises a bracket that provides for attaching the apparatus to the vehicle and said pivot comprises a pin that is operatively coupled to said bracket.

15. An apparatus for measuring a tensile load in a seat belt of a vehicle as recited in claim 1, further comprising a slide, wherein said lever is adapted to engage said slide, said slide is adapted to move within a guide portion of said reaction element, said first spring is operative between said reaction element and said slide so as to bias said slide in a first direction that causes said lever to react against said tensile load when said tensile load is received by said webbing attachment, and said displacement or proximity sensor is adapted to measure a position of said slide relative to said reaction element.

16. An apparatus for measuring a tensile load in a seat belt of a vehicle as recited in claim 15, wherein said first spring comprises a helical compression spring operative between a first end of said slide and a first end of said guide portion of said reaction element.

17. An apparatus for measuring a tensile load in a seat belt of a vehicle as recited in claim 15, further comprising a second spring, wherein said second spring is operative between said reaction element and said slide so as to bias said slide in a direction opposite to said first direction.

18. An apparatus for measuring a tensile load in a seat belt of a vehicle as recited in claim 17, wherein said second spring comprises a helical compression spring operative between a second end of said slide and a second end of said guide portion of said reaction element.

19. An apparatus for measuring a tensile load in a seat belt of a vehicle as recited in claim 17, wherein said first spring is substantially stiffer than said second spring.

20. An apparatus for measuring a tensile load in a seat belt of a vehicle as recited in claim 15, wherein said lever comprises a tang and said slide comprises a second slot that is adapted to engage said tang.

21. An apparatus for measuring a tensile load in a seat belt of a vehicle as recited in claim 20, wherein said second slot comprises at least one raised surface adapted to engage said tang.

22. An apparatus for measuring a tensile load in a seat belt of a vehicle as recited in claim 21, wherein said at least one raised surface comprises first and second raised surfaces on opposing sides of said second slot.

23. An apparatus for measuring a tensile load in a seat belt of a vehicle as recited in claim 22, wherein said first and second raised surfaces are adapted to engage said tang at respective first and second locations that are at different distances from said pivot.

24. An apparatus for measuring a tensile load in a seat belt of a vehicle as recited in claim 20, wherein said slide comprises first and second portions that are slideably engaged with one another, said first portion is adapted to engage said tang on a first side of said tang, said second portion is adapted to engage said tang on a second side of said tang, said first side of said tang is opposite to said second side of said tang, said first portion of said slide is biased against said first side of said tang by said first spring, and said second portion of said slide is biased against said second side of said tang by a second spring.

25. An apparatus for measuring a tensile load in a seat belt of a vehicle as recited in claim 15, wherein said displacement or proximity sensor comprises a combination of at least one magnet operatively coupled to said slide in cooperation with a magnetic sensor operatively coupled to said reaction element.

26. An apparatus for measuring a tensile load in a seat belt of a vehicle as recited in claim 25, wherein said at least one magnet comprises a first magnet and a second magnet.

27. An apparatus for measuring a tensile load in a seat belt of a vehicle as recited in claim 26, wherein said first magnet is operatively coupled to said slide, a pole of said first magnet is proximate to a first side of said magnetic sensor, said second magnet is operatively coupled to said slide, a pole of said second magnet is proximate to a second side of said magnetic sensor, said second side of said magnetic sensor is opposite said first side of said magnetic sensor, said first and second magnets are polarized in opposite directions relative to one another, and said first and second magnets and said magnetic sensor are substantially aligned with one another.

28. An apparatus for measuring a tensile load in a seat belt of a vehicle as recited in claim 26, wherein a north pole of said first magnet is located in a first direction relative to a south pole of said first magnet, said first direction is substantially aligned with a direction of travel of said slide, a south pole of said second magnet is located in said first direction relative to a north pole of said second magnet, said first and second magnets are astride one another, said magnetic field sensor is located between said first and second magnets, and a sensitive axis of said magnetic field sensor intersects said first and second magnets.

29. An apparatus for measuring a tensile load in a seat belt of a vehicle as recited in claim 25, wherein said magnetic sensor is selected from a Hall-effect sensor and a GMR sensor.

30. An apparatus for measuring a tensile load in a seat belt of a vehicle as recited in claim 1, further comprising a rotation stop adapted to engage said lever when said tensile load exceeds a threshold so as to substantially limit said rotation of said lever, wherein said lever comprises a third slot adapted to receive an anchor bolt by which the apparatus is attached to the vehicle, said third slot provides for motion of said anchor bolt relative thereto, and said rotational stop comprises a portion of said anchor bolt which is adapted to engage an end of said third slot.

31. An apparatus for measuring a tensile load in a seat belt of a vehicle as recited in claim 30, wherein said webbing attachment comprises an arcuate slot in said lever, said webbing of the seat belt operatively engages an edge of said arcuate slot, said edge has a center of curvature at said second location, and said center of curvature of said edge is substantially coincident with a center of said anchor bolt when said anchor bolt engages said end of said third slot.

32. A method of measuring a tensile load in a seat belt, comprising:

a. operatively coupling the tensile load from the seat belt to a lever that is adapted to rotate about a pivot, wherein the rotation is responsive to said tensile load;

b. directing a line of action of said tensile load through a center of rotation;

c. limiting said rotation of said lever responsive to said tensile load by engaging an anchor bolt with a slot in said lever;

d. applying a reaction force to said lever so as to resist said rotation of said lever about said pivot, wherein said reaction force is responsive to said rotation of said lever about said pivot; and e. generating a measure of the tensile load responsive to a measure of displacement responsive to said rotation of said lever.

33. A method of measuring a tensile load in a seat belt as recited in claim 32, further comprising adapting said slot so that when said slot is engaged with said anchor bolt, said line of action proximally intersects an axis of said anchor bolt.

34. A method of providing for measuring a tensile load in a seat belt, comprising:

a. providing for operatively coupling the tensile load from the seat belt to a lever that is adapted to rotate about a pivot, wherein the rotation is responsive to said tensile load;

b. providing for rotating a line of action of said tensile load through a center of rotation;

c. providing for limiting said rotation of said lever responsive to said tensile load by engaging an anchor bolt with a slot in said lever;

d. providing for applying a reaction force to said lever so as to resist said rotation of said lever about said pivot, wherein said reaction force is responsive to said rotation of said lever about said pivot; and e. providing for generating a measure of said tensile load responsive to a measure of displacement responsive to said rotation of said lever.

35. A method of providing for measuring a tensile load in a seat belt as recited in claim 34, further comprising adapting said slot so that when said slot is engaged with said anchor bolt, said line of action proximally intersects an axis of said anchor bolt.

36. An apparatus for measuring a tensile load in a seat belt of a vehicle, comprising:

a. a lever adapted to rotate about a pivot at a first location on said lever;

b. a webbing attachment operatively either connected to or a part of said lever, wherein said webbing attachment is adapted to operatively couple with a webbing of the seat belt so as to receive the tensile load therefrom and to transfer said tensile load so as to act on said lever at a second location on said lever, wherein said second location is displaced from said first location and said webbing attachment is adapted to direct said tensile load substantially through a center of rotation at said second location;

c. a reaction element wherein said reaction element is adapted to inhibit rotation thereof relative to the vehicle when the apparatus is operatively coupled to the vehicle; and d. a force sensor operatively coupled to said lever at a third location, wherein said force sensor is adapted to measure a force between said lever and said reaction element, and said third location is displaced from said first location.

37. An apparatus for measuring a tensile load in a seat belt of a vehicle as recited in claim 36, wherein the apparatus is mounted in the vehicle so that for at least one operating condition of the seat belt, the torque on said lever resulting from said tensile load in the seat belt is primarily caused by a vertical component of said tensile load relative to the vehicle.

38. An apparatus for measuring a tensile load in a seat belt of a vehicle as recited in claim 37, wherein said webbing attachment is adapted to be rotatable about said second location with respect to said lever responsive to a direction of said tensile load.

39. An apparatus for measuring a tensile load in a seat belt of a vehicle as recited in claim 37, wherein said webbing attachment comprises an arcuate slot in said lever, said webbing of the seat belt operatively engages an edge of said arcuate slot, and said edge has a center of curvature at said second location.

40. An apparatus for measuring a tensile load in a seat belt of a vehicle as recited in claim 36, further comprising a rotation stop adapted to engage said lever when said tensile load exceeds a threshold so as to substantially limit further rotation of said lever.

41. An apparatus for measuring a tensile load in a seat belt of a vehicle as recited in claim 36, wherein said first location is between said second and said third locations.

* * * * *